(12) United States Patent
Torigoe

(10) Patent No.: US 7,787,967 B2
(45) Date of Patent: Aug. 31, 2010

(54) PROCESS CONTROL SYSTEM

(75) Inventor: Kenji Torigoe, Musashino (JP)

(73) Assignee: Yokogawa Electric Corporation, Tokyo (JP)

(*) Notice: Subject to any disclaimer, the term of this patent is extended or adjusted under 35 U.S.C. 154(b) by 120 days.

(21) Appl. No.: 11/978,022

(22) Filed: Oct. 25, 2007

(65) Prior Publication Data

US 2008/0133030 A1  Jun. 5, 2008

(30) Foreign Application Priority Data

Oct. 26, 2006   (JP)   ............... 2006-290601

(51) Int. Cl.
*G05B 11/01* (2006.01)
(52) U.S. Cl. ............... 700/19; 700/2; 700/83; 700/87; 700/108
(58) Field of Classification Search ............... 700/2, 700/19, 83, 87, 108
See application file for complete search history.

(56) References Cited

U.S. PATENT DOCUMENTS

| | | | |
|---|---|---|---|
| 5,463,735 A * | 10/1995 | Pascucci et al. ............. | 709/222 |
| 5,841,654 A | 11/1998 | Verissimo et al. | |
| 2003/0105535 A1 * | 6/2003 | Rammler ............... | 700/17 |
| 2003/0195639 A1 | 10/2003 | Nixon et al. | |
| 2006/0074498 A1 * | 4/2006 | Kalan et al. ............. | 700/19 |

FOREIGN PATENT DOCUMENTS

| | | |
|---|---|---|
| GB | 2 341 524 A | 3/2000 |
| JP | 11-154012 | 6/1999 |

OTHER PUBLICATIONS

European Search Report for the corresponding European application No. 07019467.5-2206 dated Feb. 1, 2008.

* cited by examiner

*Primary Examiner*—Albert DeCady
*Assistant Examiner*—Douglas S Lee
(74) *Attorney, Agent, or Firm*—Westerman, Hattori, Daniels & Adrian, LLP

(57) ABSTRACT

A function block used in another process control system is previously associated with an data item by taking the function block being as data on a same rank as the data item. A definition-information generating section previously generates definition information about the function block associated with the data item, depending upon OPC browse information. An information-processing executing section executes a predetermined information processing by use of the association and the definition information.

4 Claims, 5 Drawing Sheets

PROCESS CONTROL SYSTEM

This application claims priority to Japanese Patent Application No. 2006-290601, filed Oct. 26, 2006, in the Japanese Patent Office. The priority application is incorporated by reference in its entirety.

TECHNICAL FIELD

The present disclosure relates to a process control system that is to be integrated with other systems.

RELATED ART

The followings can be considered as a method to integrate the other process control system being used in the same plant with the process control system concerned.

In the first method, as shown in FIG. 4A, an operation monitor screen 91 similarly to the system concerned can be defined by applying data values used in the other system to a graphic, by use of a general-purpose interface such as an SCADA (supervisory control and data acquisition system). Data access is through an OPC (OLE for process control) server 92.

In the second method, as shown in FIG. 4B, a parameter, such as process data, used in the other system is fetched through an OPC gateway 95. In this case, the parameters used in the other system are handled as discrete data, and a similar operation monitor screen 91 is obtained on a monitor terminal.

In the third method, as shown in FIG. 5, the other system's data gathered by way of an OPC server 92 is managed as data of mapping blocks (shadow blocks) 94 on a field controller 93. This makes it possible to manage the data in units of the function block 96 in the other system.

Japanese Patent Unexamined Publication No. 11-154012 describes a distributed control system that defines the type of input data by use of a data item name.

However, the first method involves troublesomeness in engineering, e.g. defining data assignment required for screen definition and adjusting display position. Furthermore, because there is no contrivance to fetch the data being used in the other system as data of the system concerned, such data could not be utilized within the system concerned.

Meanwhile, in the second method, because all the data of the other control system is handled separately to each other, data management is impossible on a function-block-by-function-block basis. In addition, the data of a number of function blocks is not to be handled at one time because of the upper limit in the number of data to be handled in the system concerned.

In the third method, exclusive mapping blocks must be prepared on each of the other control system to be connected. Meanwhile, there arises a problem of insufficient application capacity. For example, the number of function blocks existing on the other control system possibly exceeds the number of mapping blocks to be defined by one field controller. Furthermore, because of updating all the data of defined mapping blocks with a constant period, the burden on the OPC server 92 problematically increases.

SUMMARY

Exemplary embodiments of the present invention provide a process control system capable of effectively making use of the function blocks defined under other systems while suppressing load applied to the system and engineering burden.

A process control system for executing process control by use of a data item including process data, according to one or more embodiments of the present invention, comprises: an associating section that previously associates a function block to be used in another process control system with the data item, as data on a same rank as the data item; a definition-information generating section that previously generates definition information of the function block to be associated with the data item, depending upon OPC browse information; and an information-processing executing section that executes a predetermined information processing by use of the association performed by the associating section and the definition information generated by the definition-information generating section.

According to this process control system, a function block used in another process control system is previously associated with a data item by taking the function block as data on a same rank as the data item. Therefore, the function block defined under the other system can be effectively utilized while suppressing load applied to the system and engineering burden.

A template generating section may be further included to previously generate a template defining a set of function blocks to be used in the other process control system, depending upon OPC browse information. The definition-information generating section may generate the definition information by looking up the template.

The template generating section may accept for a user to edit the template.

The information-processing executing section may execute screen display based on the template.

The information-processing executing section may execute screen display based on the definition information.

According to the process control system of one or more embodiments of the present invention, a function block used in the other process control system is previously associated with an data item by taking the function block as data on a same rank as the data item. Therefore, this makes it possible to effectively utilize the function blocks defined under other systems while suppressing load applied to the system and engineering burden.

Other features and advantages may be apparent from the following detailed description, the accompanying drawings and the claims.

DETAILED DESCRIPTION

Figure 1:
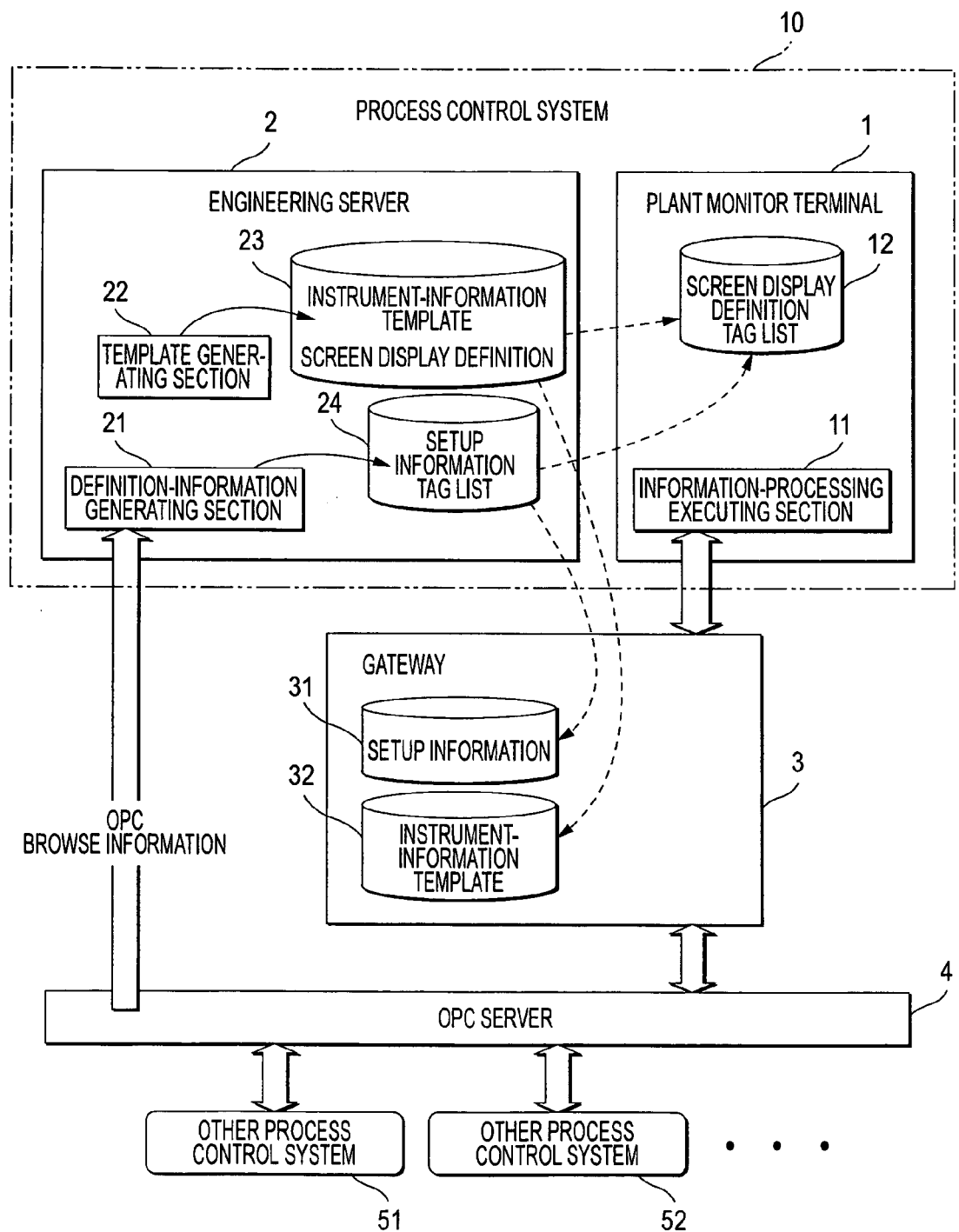
FIG. 1 is a block diagram showing a configuration of a process control system in one embodiment of the present invention.
Figure 2A:
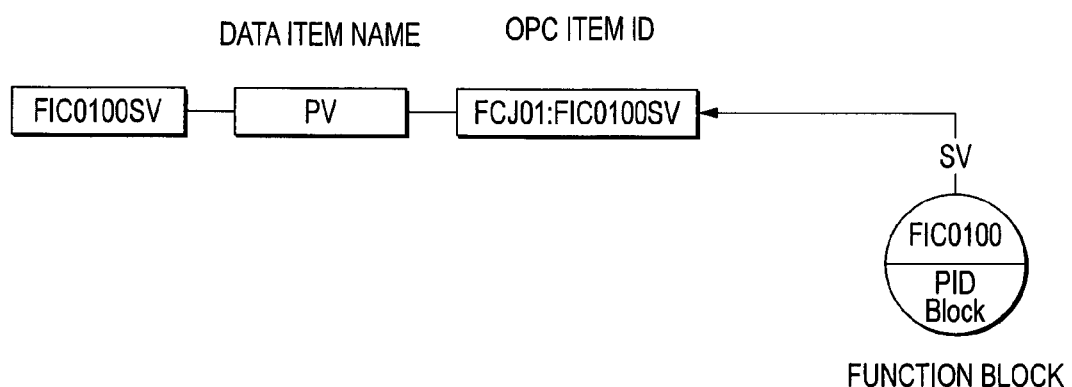
FIG. 2A is a concept figure showing a discrete-data lookup scheme that the data in one function block is to be handled separately.
Figure 2B:
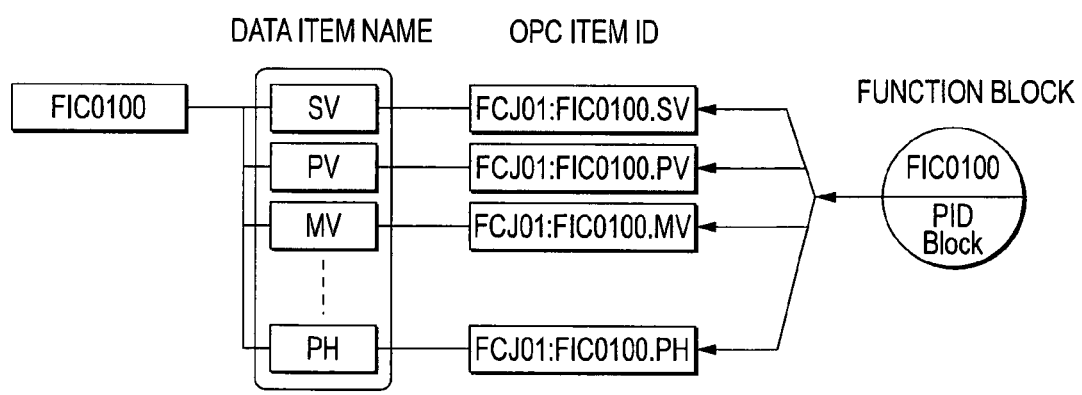
FIG. 2B is a concept figure showing a tag-data lookup scheme that the data in the function block is to be handled on a function block basis.
Figure 3:
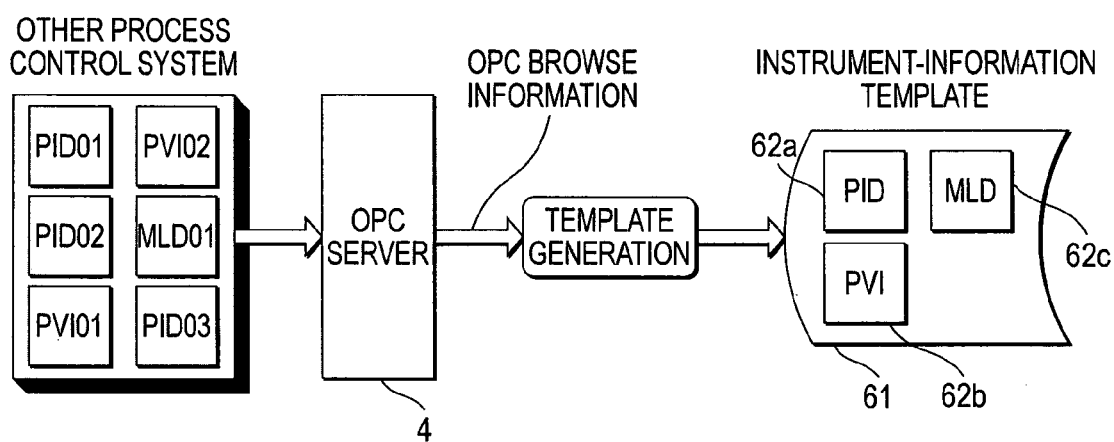
FIG. 3 is a figure showing a process to automatically generate an instrument information template.
Figure 4A:
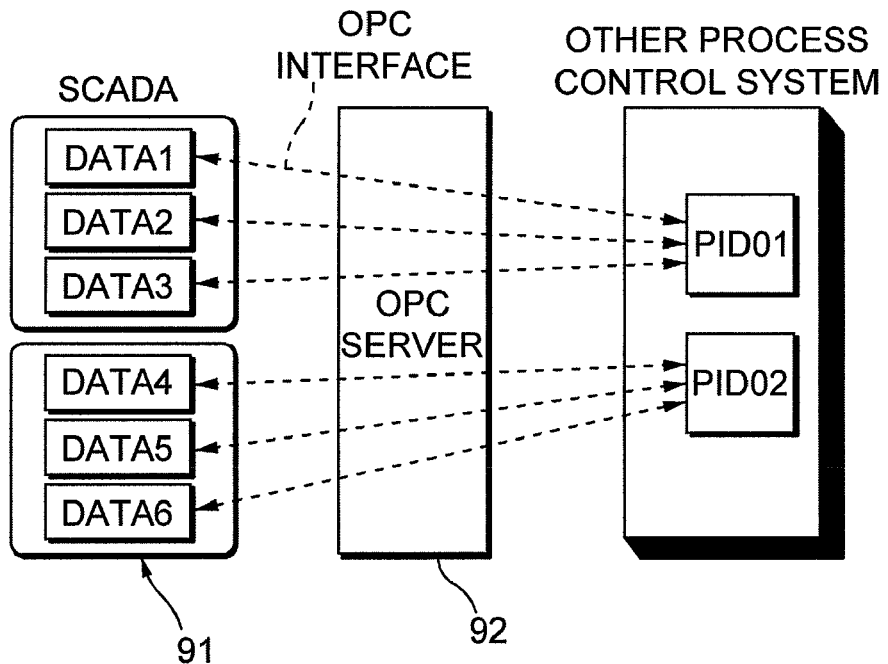
FIG. 4A is a figure showing an integration method of process control systems using a general-purpose interface.
Figure 4B:
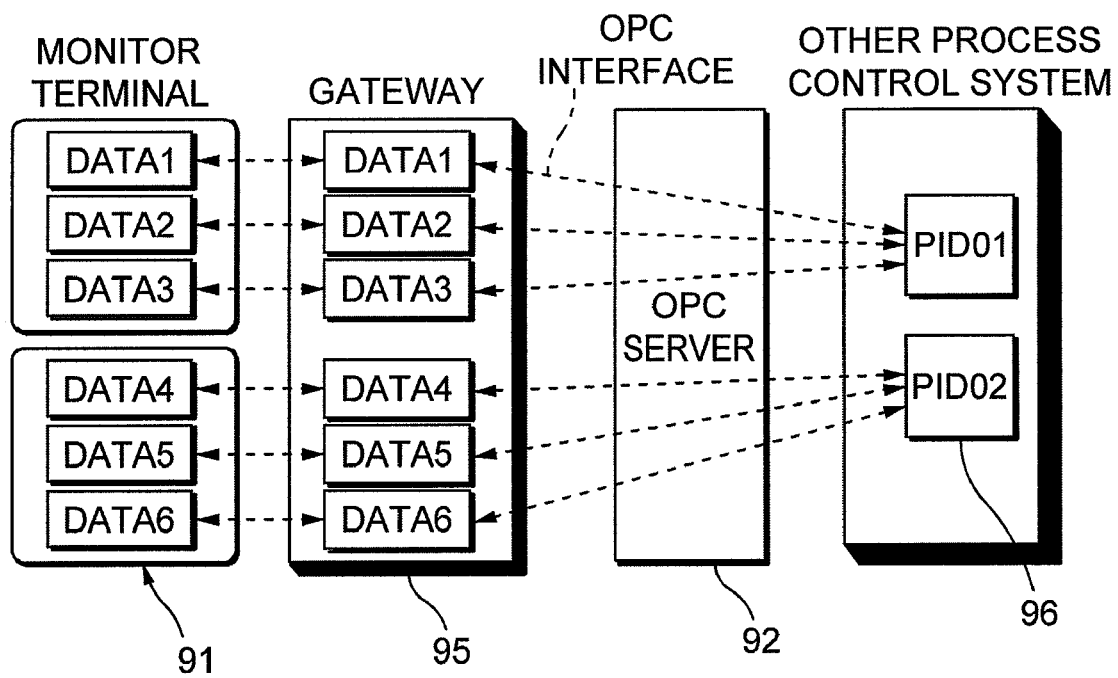
FIG. 4B is a figure showing an integration method of process control systems using an OPC gateway.
Figure 5:
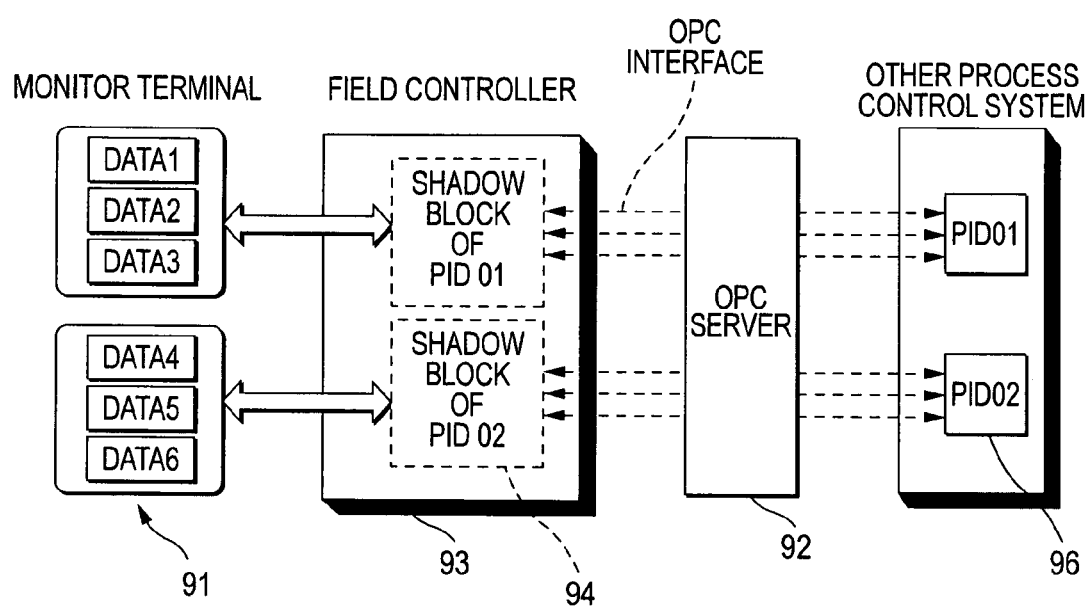
FIG. 5 is a figure showing an integration method of process control systems using mapping block.

Referring to FIGS. 1 to 3, explanation will be made below on an embodiment of a process control system according to the present invention.

FIG. 1 is a block diagram showing a configuration of a process control system according to the embodiment of the present invention.

As shown in FIG. 1, a process control system 10 includes a plant monitor terminal 1 for monitoring a group of field devices (not shown) through field controllers (not shown) distributed within a plant and an engineering server 2 for executing various engineering operations.

The process control system 10 is to be connected to other process control systems 51, 52, . . . through a gateway 3 and an OPC server 4.

As shown in FIG. 1, the plant monitor terminal 1 includes an information-processing executing section 11. The engineering server 2 includes a definition-information generating section 21 and a template generating section 22. The functions of the information-processing executing section 11, the definition-information generating section 21 and the template generating section 22 will be described later.

The process control system 10 is to execute process control by use of a data item including process data for the field devices. The process control system 10 usually handles each data item as a "tag". Further, the process control system 10 usually defines a group of a plurality of tags as a function block.

In the process control system of the embodiment, function blocks can be handled as tags by associating a function block unit to be used in other process control system 51, 52 with one tag.

FIG. 2 is a concept figure explaining the difference between a discrete-data lookup scheme (FIG. 2A) for handling the data of one function block separately and a tag-data lookup scheme (FIG. 2B) for handling the data on a function block basis. As shown in FIG. 2A, in the related-art, tags are assigned on a data-by-data basis. For example, where one function block has data in the number of fifty, fifty tags (data items) are consumed per function block. Consequently, should data in the number of one hundred of thousands is accessible as tags, function blocks to be handled would be only 2000 in the number.

On the contrary, the process control system in the present invention is to assign one tag (a plurality of data items) to one function block, thus being allowed to handle a number of function blocks.

Now explanation is made on the operation of the process control system according to the present embodiment.

The engineering server 2 has a storage section 23 storing therein an instrument information template. The instrument information template is to be automatically generated by the template generating section 22.

FIG. 3 is a figure showing a process to automatically generate an instrument information template for a function block existing in each of the other process control systems connected to the process control system 10. The instrument information template is defined with function blocks existing in the relevant system. For example, in FIG. 3, the instrument information template 61 corresponding to one system is indicated with the function block types 62a, 62b, 63c, . . . that are to be used in the relevant system.

The template generating section 22 generates instrument information templates for respective systems, depending upon the OPC browse information obtained through the OPC server 4, and previously stores the instrumental information templates in the storage section 23.

For the process control systems that are common in respect of maker or type, there are cases to use the same combination of function blocks. Accordingly, in such a case, a common instrument information template can be utilized for a plurality of systems without the need to generate new instrument information templates for individual systems.

The template generating section 22 accepts for a user to edit an instrument information template. By editing the instrument information template, data item name used when accessing from the process control system 10 to a function block of another system can be changed or unnecessary data can be deleted.

Then, explanation is made on the process of from generating a tag list, etc. up to operating/supervising the function block of the other control system at the plant monitor terminal 1.

The definition-information generating section 21 of the engineering server 2 reads out browse information through the OPC server 4 and produces setup information including OPC-item-ID assignment definitions and a tag list while looking up the instrument information template in the storage section 23. The setup information and the tag list are stored in a storage section 24.

Here, the OPC-item-ID assignment definition associates an OPC-item ID with a data item name in the process control system 10, for each function block (see FIG. 2B). In this manner, the OPC-item-ID assignment definition serves as associating section that associates a function block with a data item.

Meanwhile, the tag list associates, for each function block, between a data item name in the process control system 10 and a data (e.g. process data) group to be used in the function block. Here, the tag list corresponds to "definition information" on the function block.

The engineering server 2 is to download the setup information including the OPC-item-ID assignment definition to a storage section 31 of the gateway 3. The engineering server 2 is to download the instrument information template to a storage section 32 of the gateway 3.

Furthermore, the engineering server 2 is to download the tag list stored in the storage section 24, and the functional-block-based screen display definition stored in the storage section 23, to a storage section 12 of the plant monitor terminal 1. Due to this, by looking up the tag list and the screen display definition by the information-processing executing section 11, the plant monitor terminal 1 is allowed to display a required screen. Incidentally, by engineering the screen display definition, customization is available for the screen configuration (e.g. data type, face plate form) on the plant monitor terminal 1 to display function block data.

In this state, in case where a tuning screen of the function block is expanded on the plant monitor terminal 1, the data of other control systems 51, 52, . . . can be referred by way of the OPC server 4 by accessing of the information-processing executing section 11 to the gateway 3. The plan monitor terminal 1 is allowed to handle the function blocks of the other control systems 51, 52, . . . on a functional-block basis. On this occasion, the information-processing executing section 11 properly refers to the setup information stored in the storage section 31 and the instrument information template stored in the storage section 32.

As described so far, according to the process control system in the present embodiment, the function block of the other systems can be handled as tags. The set of the function blocks of the other control systems can be managed as a set of tags. Consequently, the other systems can be operated and monitored on a function block basis similarly to the own system. In addition, with a unified user interface, operation monitor can be made as to the function block of the other systems.

Similarly to the tags in the own system, the function blocks of the other systems can be added with attributes, e.g. alarm or access right, that the tags possesses. Furthermore, because of the capability of handing the data being used uniquely to the own system and the data being used in he other system in the similar way, it is possible to architect a new function block as a combination of the both of data and a contrivance of operation processing.

The OPC is an open interface, whose protocol is common but the context to be exchanged is different depending upon the system connected. According to the process control system in the present embodiment, system integration can be achieved by compensating the difference of such contexts.

According to the process control system in the present embodiment, there is no need to update the data at all times differently from the case using mapping blocks. By virtue of the scheme that data is to be referred in required timing, a number of function blocks of data can be handled and, at the same time, the OPC server can be relieved of load.

Meanwhile, because engineering data is to be automatically generated on the basis of the browse information obtained by the browse function of the OPC server, troublesome engineering is not required. By increasing the instrument information templates defining the function blocks used, various types of control systems can be connected without the burden of engineering.

In the embodiment, although the OPC gateway function is architected by means of the separate component (gateway 3), the OPC gateway function may be incorporated in the plant monitor terminal. With such a structure, the plant monitor terminal can be used as a general-purpose terminal not relying upon the system connected.

As explained so far, according to the process control system of the present invention, function blocks and data items are previously associated by taking the function blocks used in the other process control systems as data on the same rank as the data item. The function blocks defined on the other systems can be effectively utilized while suppressing the burden on the system and the burden due to engineering.

The application scope of the present invention is not limited to the foregoing embodiment. The invention can be applied broadly to the process control systems for executing process control by use of data items including process data.

What is claimed is:

1. A process control system comprising:
    an associating section that associates a function block to be used in another process control system with a data item including process data, as data on a same rank as the data item;
    a definition-information generating section that generates definition information of the function block to be associated with the data item, depending upon OPC browse information;
    an information-processing executing section that executes a predetermined information processing by use of the association performed by the associating section and the definition information generated by the definition-information generating section; and
    a template generating section that generates a template defining a set of function blocks to be used in the other process control system, depending upon the OPC browse information,
    wherein the definition-information generating section generates the definition information by looking up the template.

2. A process control system according to claim 1, wherein the template generating section accepts for a user to edit the template.

3. A process control system according to claim 1, wherein the information-processing executing section executes screen display based on the template.

4. A process control system according to claim 1, wherein the information-processing executing section executes screen display based on the definition information.

* * * * *